United States Patent [19]

Fuji

[11] Patent Number: 5,781,595
[45] Date of Patent: Jul. 14, 1998

[54] VOICE TRANSMITTING APPARATUS AND VOICE RECEIVING APPARATUS USING UNIQUE WORD PATTERNS

[75] Inventor: Tsuyoshi Fuji, Amagasaki, Japan

[73] Assignee: Mitsubishi Denki Kabushiki Kaisha, Tokyo, Japan

[21] Appl. No.: 491,224

[22] Filed: Jun. 16, 1995

[30] Foreign Application Priority Data

Jun. 29, 1994 [JP] Japan ................................. 6-147875

[51] Int. Cl.⁶ ........................................................ H04L 7/00
[52] U.S. Cl. ........................... 375/357; 375/368; 375/370; 370/514
[58] Field of Search ................................. 375/242, 357, 375/365, 366, 368, 370; 370/321, 324, 337, 509, 503, 514, 522

[56] References Cited

U.S. PATENT DOCUMENTS

| | | | |
|---|---|---|---|
| 4,168,469 | 9/1979 | Parikh et al. | 375/366 |
| 5,497,404 | 3/1996 | Grover et al. | 375/366 |
| 5,526,297 | 6/1996 | Snyder, Jr. et al. | 375/368 |
| 5,537,422 | 7/1996 | Shimpuku et al. | 375/366 |

FOREIGN PATENT DOCUMENTS

| | | |
|---|---|---|
| 3286634 | 12/1971 | Japan . |
| 591006 | 4/1993 | Japan . |

*Primary Examiner*—Don N. Vo
*Attorney, Agent, or Firm*—Rothwell, Figg, Ernst & Kurz

[57] ABSTRACT

A voice transmitting apparatus and a voice receiving apparatus using voice activation techniques. The voice transmitting apparatus is provided with a UW2 burst generator 8 for generating, in the absence of voice, second unique word pattern (UW2) differing from first unique word pattern (UW) used in the presence of voice. Also, the voice receiving apparatus is provided with a UW2 detection circuit which makes it silent upon the detection of the second unique word pattern (UW2), thus preventing the occurrence of unwanted sounds while positively maintaining the frame timing.

9 Claims, 9 Drawing Sheets

VOICE TRANSMITTING APPARATUS AND VOICE RECEIVING APPARATUS USING UNIQUE WORD PATTERNS

BACKGROUND OF THE INVENTION

1. Field of the Invention

The present invention relates to a voice transmitting apparatus and a voice receiving apparatus for use in, e.g., mobile satellite communication systems.

2. Description of the Related Arts

FIG. 8 depicts, by way of example, a conventional voice transmitting apparatus disclosed in Japanese Patent Laid-open Pub. No. 91006/1993. As shown, the voice transmitting apparatus comprises a transmission data generator 1, a modulator 2 for modulating output signals of the transmission data generator, a voice detector 3 for detecting the presence or absence of voice data and sending the results of detection to both the transmission data generator 1 and a unique word (UW) burst generator 4, and the UW burst generator 4 for generating UW bursts and sending them to the modulator 2.

FIGS. 9A and 9B depict the states of the output of voice data at frame cycles. FIG. 9A represents the last portion of the voice data in the case where the voice data have changed from the state of utterance (presence of voice) into the state of silence (absence of voice). FIG. 9B represents the leading portion of the voice data in the case where the voice data have changed from the state of silence (absence of voice) into the state of utterance (presence of voice). As is clear from the diagrams, unique word patterns UW (hereinafter referred to as UW patterns) are inserted into the heads of the voice data, an end of pattern EP is inserted into the tail of the voice data of a frame which has changed into the state of silence, and a preamble pattern PP is inserted into the heads of the leading frame of the voice data which have changed into the state of utterance. In the absence of the voice data, activation bursts UW, identical to the UW patterns, are output in synchronism with the frame cycles.

An action of the voice transmitting apparatus will now be described. Digitized voice data are provided as input to the transmission data generator 1 where UW patterns UW are affixed to the input voice data at frame cycles. In the mobile satellite communication systems, for example, use is made of voice activation techniques permitting transmissions only when voices are present, in order to enhance power efficiencies of satellites. In the voice activations, the preamble pattern PP is affixed to the head of the voice data, and the end of pattern EP is affixed to the tail of the voice data. The transmission data generator 1 affixes the preamble pattern PP to the input voice data, and affixes, in response to an end signal derived from the voice detector 3, the end of pattern EP thereto. Thus created transmission data are sent to the modulator 2 where the data are subjected to modulations such as QPSK for transmission. In the absence of the voice data, on the contrary, short-duration signals called activation bursts UW are generated to maintain the frame timing on the receiver side. The UW burst generator 4 serving to generate those signals receives frame timing pulses from the transmission data generator 1 and, if the voices are judged to be absent from the voice data derived from the voice detector 3, provides the activation burst UW signals as output to the modulator 2.

In receiving those voice data, the voice receiving apparatus decodes only frames having the UW patterns detected, for the purpose of preventing the voice decoder from generating unwanted sounds at the time of occurrence of transmission errors. A configuration of the voice receiving apparatus is shown in FIG. 10. As shown, the voice receiving apparatus comprises a demodulator 5 for demodulating input voice data, a voice decoder 6 for decoding the demodulated data output from the demodulator 5, and a unique word detector (hereinafter referred to as UW detector) for detecting UW patterns from the demodulated data output from the demodulator 5 and supplying both enabling signals and frame timing pulses to the voice decoder 6. In poor receiving states, if the demodulated data from the demodulator 5 contain numerous errors, decoding of those demodulated data by the voice decoder 6 may possibly bring about unwanted sounds. To avoid this, therefore, the UW detector 7 monitors whether the UW patterns are properly received or not, and only when properly received, sends enabling signals to the voice decoder 6 to allow the demodulated data to be decoded. Upon the detection of the end of patterns EP, the voice decoder 6 is rendered silent.

The conventional voice transmitting apparatus and the voice receiving apparatus are thus configured, and accordingly, if the voice receiving apparatus fails to catch the end of pattern EP at the time of activation bursts, the voice decoder will remain enabled. In this case, since the demodulator demodulates signal-free segments, the demodulated data will result in totally random data. Thus, the voice decoder tends to decode the random data, resulting in the occurrence of unwanted sounds from the voice decoder.

SUMMARY OF THE INVENTION

The present invention was conceived to overcome the above problems. It is therefore the object of the present invention to provide a voice transmitting apparatus ensuring positive transmission of activation bursts to a voice receiving apparatus, and to provide the voice receiving apparatus capable of preventing unwanted sounds from occurring upon the activation burst.

According to a first aspect of the present invention, there is provided a voice transmitting apparatus comprising a voice detector for receiving voice data in frame cycles, to detect the presence or absence of any voice in the frames, and generating an end signal when the frames have changed into the state of silence; a transmission data generator for inserting a preamble pattern immediately before the leading edge of the first frame of input whose voice data have changed into the state of utterance, the transmission data generator inserting first unique word patterns into the heads of the frames in the presence of voice; a unique word burst generator for generating, in response to the output of the end signal, a second unique word pattern in synchronism with a frame timing pulse fed from the transmission data generator; and a modulator for modulating, upon reception of the output from the unique burst generator, the voice data having the frame into the head of which the second unique word pattern has been inserted.

According to a second aspect of the present invention, there is provided a voice transmitting apparatus comprising a voice detector for receiving voice data in frame cycles to detect the presence or absence of any voice in the frames and generating an end signal when the frames have changed into the state of silence; a transmission data generator for inserting a preamble pattern immediately before the leading edge of the first frame of input whose voice data have changed into the state of utterance, the transmission data generator inserting first unique word patterns into the heads of the frames in the presence of voice; a unique word burst generator for inserting into the head of the frame, in response to the output of the end signal, the first unique word pattern and an end of pattern indicating that the frame has changed into the state of silence, in synchronism with a frame timing pulse fed from the transmission data generator; and a modulator for modulating, upon reception of the output from the unique burst generator, the voice data having the frame into the head of which the first unique word pattern and the end of pattern have been inserted.

According to a third aspect of the present invention, there is provided a voice receiving apparatus comprising a demodulator for receiving frame-cyclic voice data containing patterns to generate demodulated data, the patterns including a preamble pattern to be inserted immediately before the leading edge of the first frame of the voice data which have changed into the state of utterance, first unique word patterns to be inserted into the heads of the frames in the presence of voice, and second unique word patterns to be inserted into the heads of the frames which have changed into the state of silence; a unique word detector for detecting the unique word patterns of the demodulated data; and a voice decoder for decoding the demodulated data in synchronism with a frame timing pulse fed from the unique word detector, the voice decoder being enabled upon reception of a first unique word pattern detection signal fed from the unique word detector, the voice decoder being disabled upon reception of a second unique word pattern detection signal.

According to a fourth aspect of the present invention, there is provided a voice receiving apparatus comprising a demodulator for receiving frame-cyclic voice data with patterns to generate demodulated data, the patterns including a preamble pattern to be inserted immediately before the leading edge of the first frame of the voice data which have changed into the state of utterance, first unique word patterns to be inserted into the heads of the frames in the presence of voice, and end of patterns to be inserted into the tails of the frames which have changed into the state of silence; a unique word detector for detecting the preamble pattern of the demodulated data to generate enabling signals while detecting the end of patterns to generate disabling signals, the unique word detector detecting the first unique word pattern to generate frame timing pulses; a level detector for generating disabling signals when signal levels of voice data of the demodulated data are not more than a predetermined value; and a voice decoder for decoding the demodulated data in synchronism with the frame timing pulses, the voice decoder being disabled upon reception of the disabling signals fed from the unique word detector and the level detector.

According to a fifth aspect of the present invention, there is provided a voice receiving apparatus comprising a demodulator for receiving frame-cyclic voice data with patterns to generate demodulated data, the patterns including a preamble pattern to be inserted immediately before the leading edge of the first frame of the voice data which have changed into the state of utterance, first unique word patterns to be inserted into the heads of the frames in the presence of voice, and end of patterns to be inserted into the tails of the frames which have changed into the state of silence; an error correcting decoder for decoding error correcting codes affixed to the voice data; an error correcting encoder for restoring the output of the error correcting decoder into codes of the demodulated data; an error judgment device for comparing the output of the error correcting encoder with the demodulated data and when the accumulative value of non-coincident codes exceeds a predetermined value, generating a disabling signal; and a voice decoder for decoding the output of the error correcting decoder, the voice decoder being disabled upon reception of the disabling signal.

According to a sixth aspect of the present invention, there is provided a voice receiving apparatus comprising a demodulator for receiving frame-cyclic voice data containing patterns to generate demodulated data, the patterns including a preamble pattern to be inserted immediately before the leading edge of the first frame of the voice data which have changed into the state of utterance, unique word patterns to be inserted into the heads of the frames in the presence and absence of voice, and end of patterns to be inserted into the heads of the frames which have changed into the state of silence; a unique word detector for detecting the unique word patterns of the demodulated data; and an end of pattern detector for the end of patterns of the demodulated data; and a voice decoder for decoding the demodulated data in synchronism with frame timing pulses issued from the unique word detector and the end of pattern detector, the voice decoder being enabled upon reception of a unique word pattern detection signal sent out from the unique word detector, the voice decoder being disabled upon reception of an end of pattern detection signal sent out from the end of pattern detector.

In the voice transmitting apparatus according to the first aspect of the present invention, the unique word burst generator generates the second unique word patterns in response to the end signals sent out from the voice detector when the frames have changed into the state of silence, and in synchronism with the frame timing pulses issued from the transmission data generator. Thus, upon reception of the output of the unique word burst, the demodulator demodulates the voice data having the second unique word pattern inserted thereinto and provides them as its output.

In the voice transmitting apparatus according to the second aspect of the present invention, the unique word burst generator generates the first unique word patterns and end of patterns indicating that the frames have changed into the state of silence, in response to the end signals sent out from the voice detector when the frames have changed into the state of silence, and in synchronism with the frame timing pulses issued from the transmission data generator. Thus, upon the reception of the output of the unique word burst, the demodulator demodulates and outputs the voice data whose frames have the first unique word patterns and the end of patterns inserted into their respective heads.

In the voice receiving apparatus according to the third aspect of the present invention, the demodulator receives the voice data with patterns including the first unique word patterns or the second unique word patterns and outputs the demodulated data. When the unique word detector generates a first unique word pattern detection signal, the voice decoder is enabled to decode the voice data, whereas upon the output of a second unique word pattern detection signal the voice decoder is disabled to render the voice data silent.

In the voice receiving apparatus according to the fourth aspect of the present invention, the unique word detector generates an enabling signal upon the detection of the preamble pattern of the demodulated data, generates disabling signals upon the detection of the end of patterns, and generates frame timing pulses by detecting the first unique word patterns. The level detector produces a disabling signal when the voice data levels of the demodulated data are not more than a predetermined value. The voice decoder decodes the demodulated data in synchronism with the frame timing pulses, and is disabled upon reception of the disabling signals fed from the unique word detector and the level detector. Consequently, the voice data are decoded with the output of the enabling signals, whereas with the output of the disabling signals they become silent.

In the voice receiving apparatus according to the fifth aspect of the present invention, the error correcting decoder decodes error correcting codes affixed to the demodulated data derived from the demodulator, and the error correcting encoder restores the output of the error correcting decoder into codes of the demodulated data derived from the demodulator. The error judgment device compares the output of the error collecting encoder with the demodulated data and when the accumulative value of noncoincident codes exceeds a predetermined value, generates a disabling signal. The voice decoder decodes the output of the error correcting decoder and is disabled upon reception of the disabling signal. Thus, with the output of the disabling signal, the voice data results in the state of silence.

In the voice receiving apparatus according to the sixth aspect of the present invention, the demodulator receives voice data containing patterns including unique word patterns or the end of patterns to generate demodulated data. The voice decoder is enabled upon reception of a unique word pattern detection signal issued from the unique word detector, to decode the voice data. On the contrary, the voice decoder is disabled upon reception of an end of pattern detection signal issued from the end of pattern detector, to render the voice data silent.

BRIEF DESCRIPTION OF THE DRAWINGS

These and other objects and advantages of the present invention will become more apparent from the following detailed description when taken in conjunction with the accompanying drawings, in which.

DESCRIPTION OF THE PREFERRED EMBODIMENTS

Embodiment 1

Figure 1:
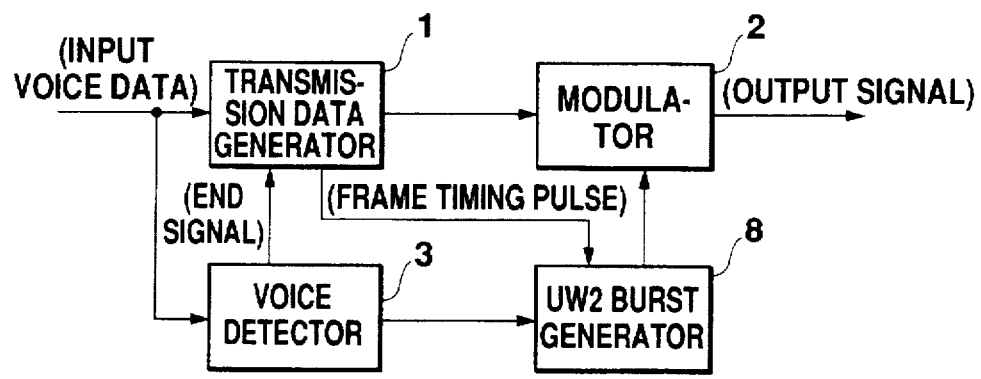
FIG. 1 is a diagram depicting a configuration of a voice transmitting apparatus according to a first embodiment of the present invention.
Figure 8:
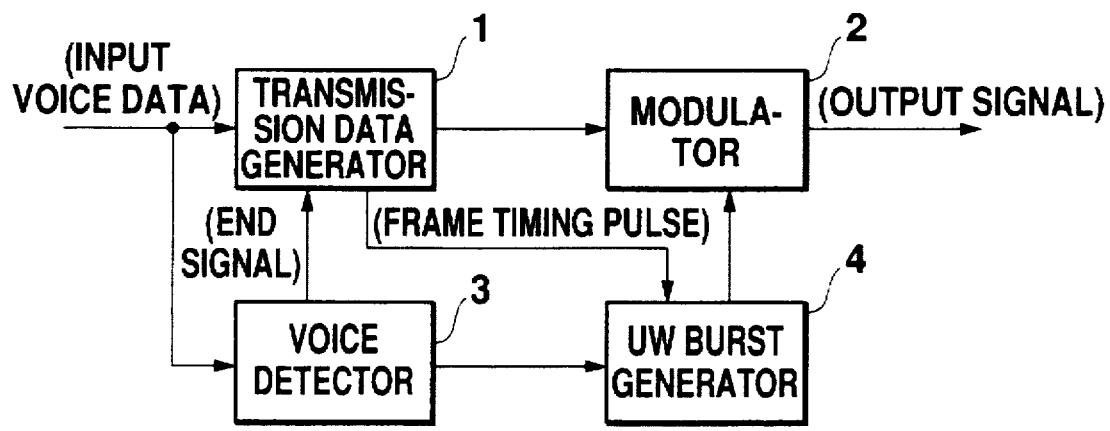
FIG. 8 is a configurative diagram of a conventional voice transmitting apparatus.

A preferred embodiment of the present invention will now be described with reference to the accompanying drawings. FIG. 1 depicts a configuration of a voice transmitting apparatus of this embodiment. Identical or corresponding parts to those in FIG. 8 are designated by common reference numerals. As shown, the voice transmitting apparatus comprises a transmission data generator 1, a modulator 2, a voice detector 3, and a UW2 burst generator 8.

Figure 2A:
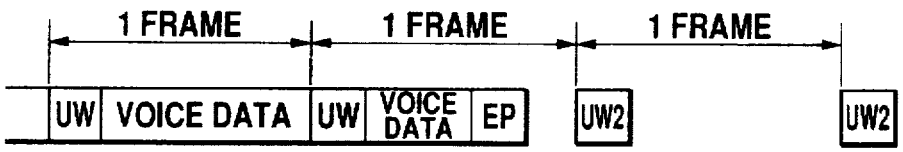
FIGS. 2A and 2B are diagrams explaining voice data output from the voice transmitting apparatus of the present invention.
Figure 2B:
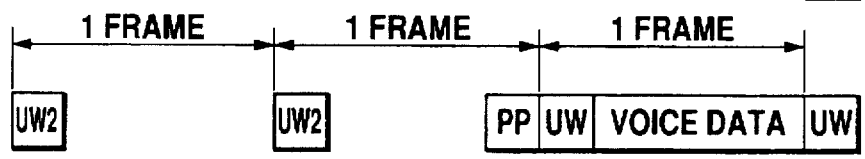
Figures 9A, 9B:
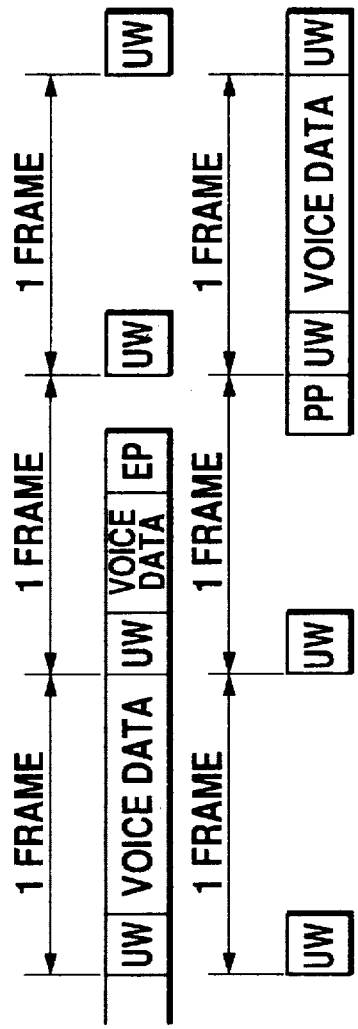
FIGS. 9A and 9B are diagrams for the explanation of voice data output from the conventional voice transmitting apparatus.
Figure 10:
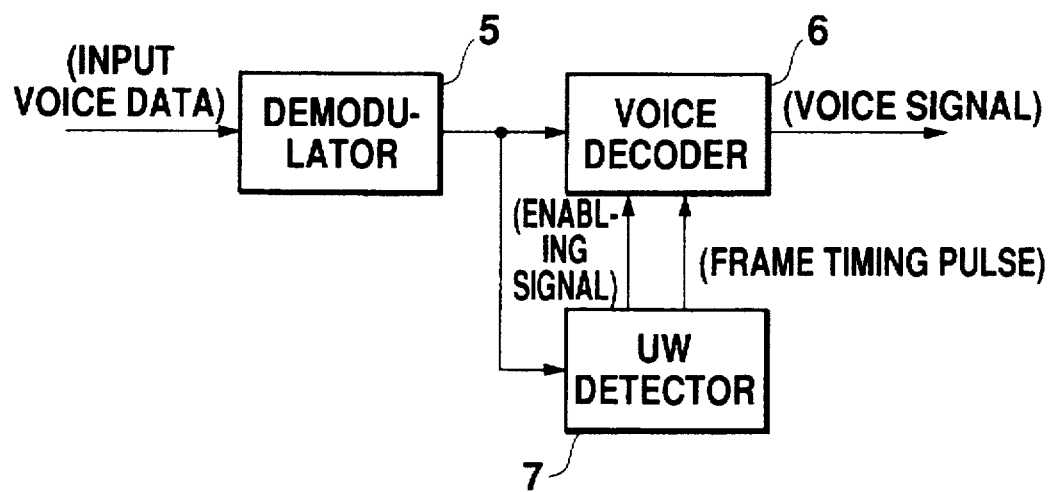
FIG. 10 is a diagram depicting a configuration of the conventional voice receiving apparatus.

FIGS. 2A and 2B are diagrams for explaining the state of voice data in frame cycles to be output by the voice transmitting apparatus of this embodiment. Identical or corresponding parts to those in FIGS. 9A and 9B are designated by common reference numerals. Upon activation bursts, as is apparent from the diagram, an activation burst UW2, differing from a UW pattern UW, is output in synchronism with the frame cycles.

Description will now be given of an action of the voice transmitting apparatus of this embodiment. The transmission data generator 1 adds, to speech signals, a preamble pattern PP, the UW pattern UW, and an end of pattern EP, and sends them to the modulator 2. The voice detector 3 detects the presence or absence of a speech signal, feeds the result to the UW2 burst generator 8, and in the absence of the speech signal feeds an end signal to the transmission data generator 1. The UW2 burst generator 8 receives both a frame timing pulse from the transmission data generator 1 and a signal from the voice detector 3, and in the absence of a speaker's voice, that is, upon the output of the end signal from the voice detector 3, sends a UW2 signal to the modulator 2 at a frame timing.

Figure 3:
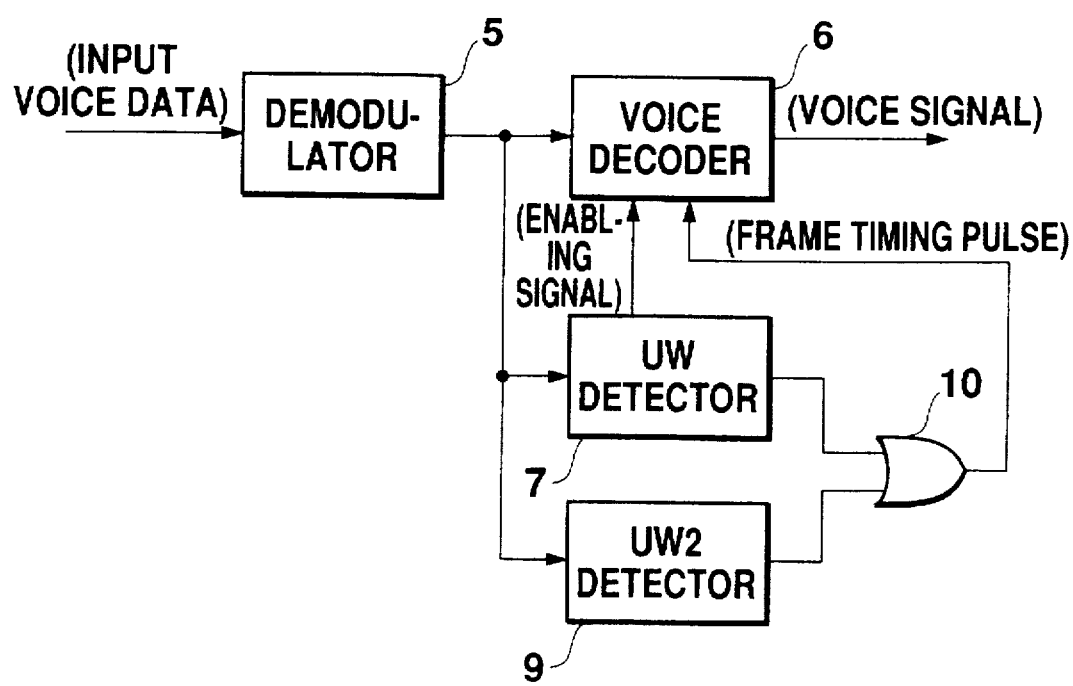
FIG. 3 is a configurative diagram of a voice receiving apparatus according to the first embodiment of the present invention.

A voice receiving apparatus of this embodiment will now be described with reference to FIG. 3 depicting a configuration thereof. As shown, the voice receiving apparatus comprises a demodulator 5, a voice decoder 6, a UW detector for detecting the UW pattern shown in FIGS. 2A and 2B, a UW2 detector for detecting the UW2 pattern also shown in FIGS. 2A and 2B from demodulated data output of the demodulator 5, and an OR circuit for finding a logical sum of detection pulses from the UW detector 7 and the UW2 detector 9 to generate a frame timing pulse for the transfer to the voice decoder 6. Input signals are provided as shown in FIGS. 2A and 2B, and voice data demodulated through the demodulator 5 are delivered to not only the voice decoder 6, but also to the UW detector 7 and the UW2 detector 9. At the frame where a UW pattern has been detected by the UW detector 7, the action of the voice decoder 6 becomes enabled to decode the voice data. On the contrary, upon the activation burst, the UW2 detector 9 detects a UW2 pattern UW2 and forwards a detection signal to the voice decoder 6, whereby the action of the voice decoder 6 becomes disabled to produce silent speech signals. When detecting the UW pattern UW or the UW2 pattern UW2, respective detection pulses are combined in the OR circuit 10 to be provided as a frame timing pulse to the voice decoder 6. Thus, the frame timing pulse is not allowed to disappear irrespective of the presence or absence of a voice upon the activation burst.

According to the above configurations, upon the activation burst, the voice transmitting apparatus provides as its output the UW2 pattern UW2, differing from the UW pattern UW, whereby a secure transmission of the activation burst can be ensured to the voice receiving apparatus.

Should the voice receiving apparatus fail to catch the end of pattern EP, it is capable of detection of the activation burst by the presence of the UW2 pattern UW2 to be transmitted every frame cycle, thus preventing the occurrence of unwanted sounds.

It is to be appreciated that the activation burst can be detected by the UW2 pattern UW2 without inserting the end of pattern EP which has been inserted in this embodiment.

Embodiment 2

Figures 4A, 4B:
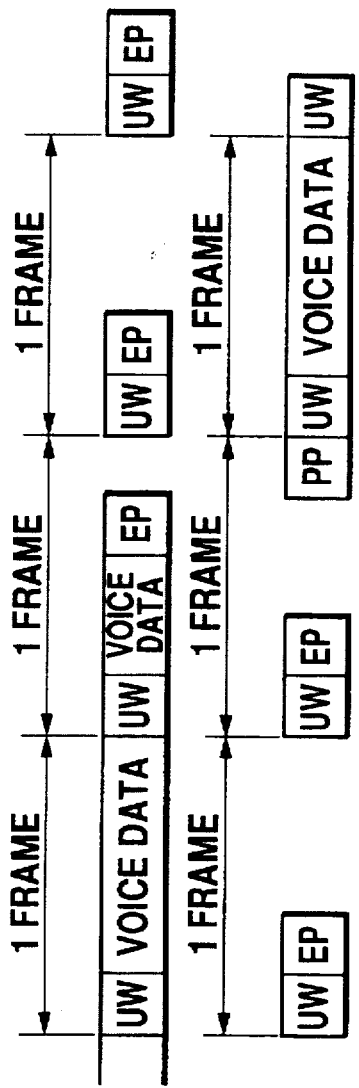
FIGS. 4A and 4B are explanatory diagrams of voice data output from a voice transmitting apparatus according to a second embodiment of the present invention.

A preferred embodiment of a voice transmitting apparatus in another aspect will now be described. The voice transmitting apparatus of this embodiment has substantially the same configuration as that shown in FIG. 8, except that the state of the voice data upon the activation burst is as shown in FIGS. 4A and 4B in which elements identical or corresponding to those in FIGS. 9A and 9B are correspondingly referenced. FIGS. 4A and 4B differ from FIGS. 9A and 9B in that upon the activation burst, the activation burst UW is followed by an end of pattern EP which is inserted by a UW burst generator 4.

Such a configuration of voice data ensures a secure transmission of the activation burst to the voice receiving apparatus.

Figure 4C:
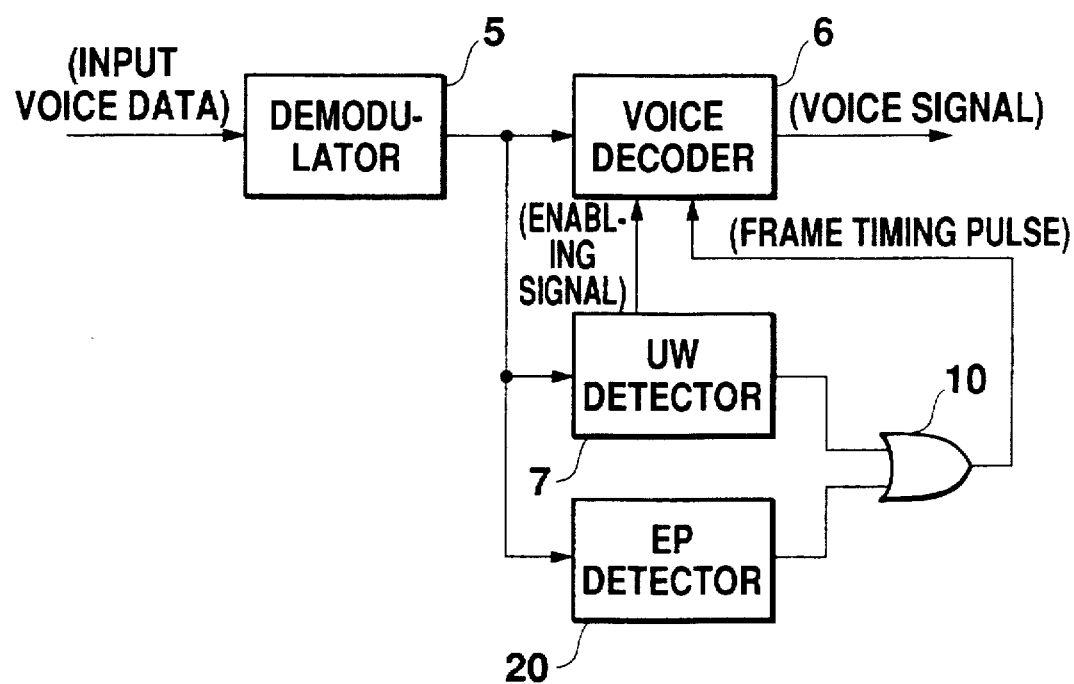
FIG. 4C illustrates a voice receiving apparatus configured in accordance with the second embodiment of the present invention.

As depicted in FIG. 4C, on the other hand, a voice receiving apparatus comprises an EP detector 20 for detecting the end of pattern EP to render a voice decoder 6 disabled, thereby accomplishing the same effect as in the first embodiment.

Embodiment 4

Figure 5:
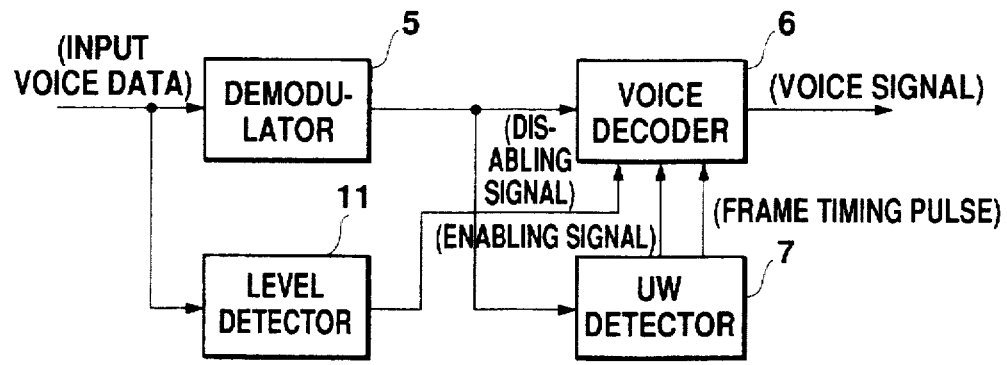
FIG. 5 illustrates a voice receiving apparatus configured in accordance with a third embodiment of the present invention.

A configuration of a voice receiving apparatus of this embodiment is depicted in FIG. 5 where elements identical or corresponding to those in FIG. 8 are correspondingly referenced. As shown, the voice receiving apparatus comprises a level detector 11 for detecting signal levels of input voice data.

The action thereof will now be explained. Given that the value of the signal level of the input voice data detected by the level detector 11 is not more than a predetermined value, then the level detector 11 issues a disabling signal to the voice decoder 6 to cease the action of the voice decoder 6. The input frame-cyclic voice data are as shown in FIGS. 9A and 9B. Upon the activation burst, noise data which have entered a voice-data-free portion cause the action of the voice decoder 6 to be stopped due to its lower signal levels, resulting in silent output. In this manner, regardless of the same voice data as those shown in FIGS. 9A and 9B output by the voice receiving apparatus having a UW burst generator 4 as in the prior art, the provision of the level detector 11 into the voice receiving apparatus will ensure a similar effect to the above embodiments.

Embodiment 5

Figure 6:
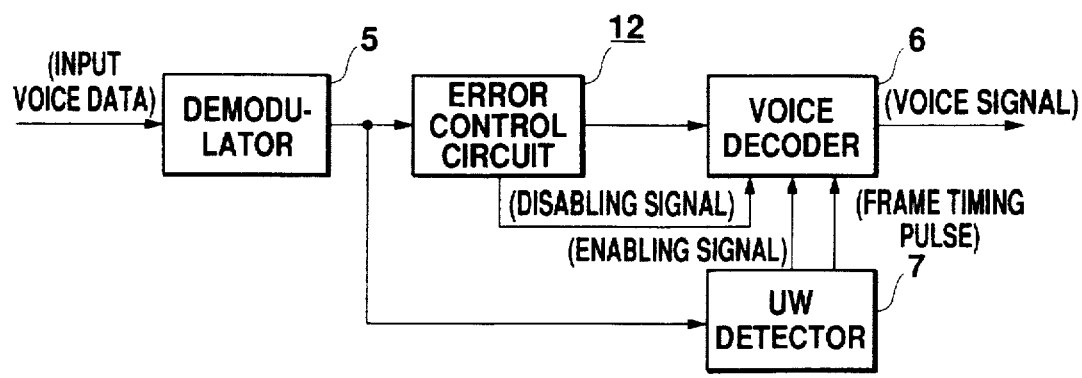
FIG. 6 illustrates a voice receiving apparatus configured in accordance with a fourth embodiment of the present invention.
Figure 7:
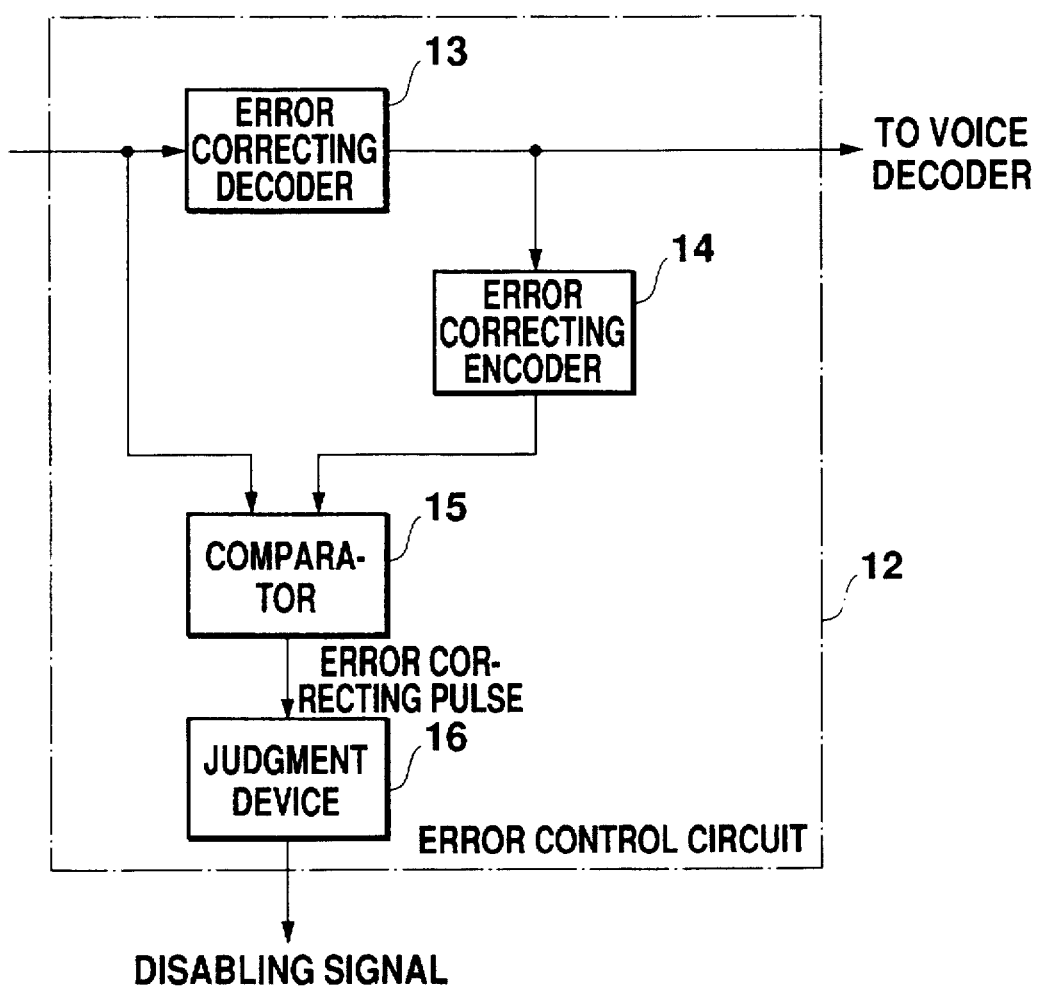
FIG. 7 is a diagram showing a configuration of an error control circuit of FIG. 6.

A configuration of a voice receiving apparatus of this embodiment is depicted in FIG. 6 where the same reference numerals are used to denote identical or corresponding elements to those in FIG. 8. As shown, the voice receiving apparatus comprises an error control circuit 12 for decoding demodulated data supplied from a demodulator 5. Input voice data to the demodulator 5 are provided with predetermined error correcting codes corresponding to errors which may take place on transmission paths. Referring to FIG. 7, there is depicted a configuration of the error control circuit 12. It comprises an error correcting decoder 13 for decoding the error correcting codes of the demodulated data as well as correcting errors in accordance with a predetermined rule; an error correcting encoder 14 for recoding, into demodulated data of the demodulator 5, the decoded data obtained when the error correcting decoder 13 has corrected the errors; a comparator 15 for comparing the error correcting codes of the demodulated data with the error correcting codes recoded by the error correcting encoder 14 and if not coincident judging that errors have occurred to generate error correcting pulses; and a judgment device 16 for counting the error correcting pulses and, when the count of the error correcting pulses exceeds a predetermined value within a given period of time, issuing a disabling signal to the voice decoder 6.

Upon reception of the disabling signal, the voice decoder 6 ceases its action. The frame-cyclic voice data to be input to the voice receiving apparatus of this embodiment are the same as those shown in FIGS. 9A and 9B although at the time of activation burst the output of the demodulator 5 results in random data and hence in errors exceeding the predetermined values, thus bringing the action of the voice decoder 6 to a stop and presenting the state of silence.

By virtue of the above configuration, upon the activation burst, the occurrence of unwanted sounds can be positively prevented for the voice data having error correcting codes output from the conventional voice transmitting apparatus.

It will be understood by those skilled in the art that a number of variations and modifications may be made in the present invention without departing from its spirit and scope. Accordingly, the foregoing description is to be construed as illustrative only rather than limiting. The present invention is limited only by the scope of the following claims.

What is claimed is:

1. A voice transmitting apparatus comprising:
   a voice detector for receiving voice data in cycles of frames to detect the presence or absence of any voice data in said frames and generating an end signal when the state of said frames has changed from a state containing voice data to a state of silence not containing voice data;
   a transmission data generator for inserting a preamble pattern immediately before the leading edge of the first frame of input voice data which have changed into the state of utterance, said transmission data generator inserting first unique word patterns into the heads of said frames in the presence of voice;
   a unique word burst generator for generating, in response to the output of said end signal, a second unique word pattern different from said first unique word pattern in synchronism with a frame timing pulse fed from said transmission data generator; and
   a modulator for inserting into said frames either said first unique word burst or said second unique word burst as generated by said unique word generator, and transmitting the resultant signal over a transmission medium.

2. A voice transmitting apparatus comprising:
   a voice detector for receiving voice data in cycles of frames to detect the presence or absence of any voice data in said frames and generating an end signal when the state of said frames has changed from a state containing voice data to a state of silence not containing voice data;
   a transmission data generator for inserting a preamble pattern immediately before the leading edge of the first frame of input voice data which have changed into the state of utterance, said transmission data generator inserting first unique word patterns into the heads of said frames in the presence of voice;

a unique word burst generator for generating, in response to the output of said end signal, into the head of said frame said first unique word pattern and an end of pattern indicating that said frame has changed into the state of silence, in synchronism with a frame timing pulse fed from said transmission data generator; and a modulator for modulating, upon reception of the output from said unique burst generator, said voice data having said frame into the head of which said second unique word pattern and said end of pattern has been inserted.

3. A voice receiving apparatus comprising:

a demodulator for receiving frame-cyclic voice data with patterns to generate demodulated data, said patterns including a preamble pattern to be inserted immediately before the leading edge of the first frame of said frame-cyclic voice data which have changed into the state of utterance, first unique word patterns to be inserted into the heads of voice data frames in the presence of voice, and second unique word patterns different from said first unique word patterns to be inserted into the heads of frames which have changed into the state of silence;

a unique word detector for detecting said first and second unique word patterns of said demodulated data; and a voice decoder for decoding said demodulated data in synchronism with a frame timing pulse fed from said unique word detector, said voice decoder being enabled upon reception of a first unique word pattern detection signal fed from said unique word detector, said voice decoder being disabled upon reception of a second unique word pattern detection signal.

4. A voice receiving apparatus comprising:

a demodulator for receiving frame-cyclic voice data with patterns to generate demodulated data, said patterns including a preamble pattern to be inserted immediately before the leading edge of the first frame of said frame-cyclic voice data which have changed into the state of utterance, first unique word patterns to be inserted into the heads of said frames in the presence of voice, and end of patterns to be inserted into the tails of voice data frames which have changed into the state of silence;

a unique word detector for detecting said preamble pattern of said demodulated data to generate enabling signals while detecting said end of patterns to generate disabling signals, said unique word detector detecting said first unique word pattern to generate frame timing pulses;

a level detector for generating disabling signals when signal levels of voice data of said demodulated data are not more than a predetermined value; and a voice decoder for decoding said demodulated data in synchronism with said frame timing pulses, said voice decoder being disabled upon reception of said disabling signals fed from said unique word detector and said level detector.

5. A voice receiving apparatus comprising:

a demodulator for receiving frame-cyclic voice data with patterns to generate demodulated data, said patterns including a preamble pattern to be inserted immediately before the leading edge of the first frame of said fame-cyclic voice data which have changed into the state of utterance, first unique word patterns to be inserted into the heads of voice data frames in the presence of voice, and end of patterns to be inserted into the tails of said frames which have changed into the state of silence;

an error correcting decoder for decoding error correcting codes affixed to said frame-cyclic voice data;

an error correcting encoder for restoring the output of said error correcting decoder into codes of said demodulated data;

an error judgment device for comparing the output of said error correcting encoder with said demodulated data and when the accumulative value of noncoincident codes exceeds a predetermined value, generating a disabling signal; and a voice decoder for decoding the output of said error correcting decoder, said voice decoder being disabled upon reception of said disabling signal.

6. A voice receiving apparatus comprising:

a demodulator for receiving frame-cyclic voice data with patterns to generate demodulated data, said patterns including a preamble pattern to be inserted immediately before the leading edge of the first frame of said frame-cyclic voice data which have changed into the state of utterance, unique word patterns to be inserted into the heads of voice data frames in the presence and absence of voice, and end of patterns to be inserted into the heads of said frames which have changed into the state of silence;

a unique word detector for detecting said unique word patterns of said demodulated data; and an end of pattern detector for detecting said end of patterns of said demodulated data; and a voice decoder for decoding said demodulated data in synchronism with frame timing pulses issued from said unique word detector and said end of pattern detector, said voice decoder being enabled upon reception of a unique word pattern detection signal sent from said unique word detector, said voice decoder being disabled upon reception of an end of pattern detection signal sent from said end of pattern detector.

7. A system for transmitting and receiving voice signals, comprising:

a voice transmitting apparatus including a voice detector for receiving input data frames and detecting the presence of voice data in said frames and outputting an end signal when the state of said frames has changed from a state containing voice data to a state of silence not containing voice data, a unique word generator for receiving a frame timing pulse and the output of said voice detector and for generating a first unique word burst in synchronism with said frame timing pulse in the absence of said end signal, and generating a second unique word burst different from said first unique word burst in synchronism with said frame timing pulse in response to the receipt of said end signal, a modulator for inserting into said frames either said first unique word burst or said second unique word burst as generated by said unique word generator, and transmitting the resultant signal over a transmission medium; and a voice receiving apparatus including a demodulator for receiving transmitted voice signals from said modulator, a unique word detector for detecting unique word bursts in said received voice signals and outputting a frame timing pulse in response to unique word bursts and also outputting an enabling signal in response to the detection of said first unique word burst, and a voice decoder for decoding said received voice data in response to said enabling signal from said unique word detector.

8. A system for transmitting and receiving voice signals as set forth in claim 7, wherein said first unique word burst comprises a first unique word pattern and said second unique word burst comprises a second unique word pattern.

9. A system for transmitting and receiving voice signals as set forth in claim 7, wherein said first unique word burst comprises a first unique word pattern and said second unique word burst comprises said first unique word pattern together with an end pattern.

* * * * *